(12) United States Patent
Maatuk

(10) Patent No.: US 7,334,471 B2
(45) Date of Patent: Feb. 26, 2008

(54) LIQUID SENSOR AND ICE DETECTOR

(75) Inventor: Josef Maatuk, 1607 S. Sherbourne Dr., Los Angeles, CA (US) 90035

(73) Assignee: Josef Maatuk, L.A., CA (US)

( * ) Notice: Subject to any disclaimer, the term of this patent is extended or adjusted under 35 U.S.C. 154(b) by 0 days.

(21) Appl. No.: 11/641,434

(22) Filed: Dec. 18, 2006

(65) Prior Publication Data

US 2007/0113646 A1    May 24, 2007

Related U.S. Application Data

(63) Continuation of application No. 10/736,116, filed on Dec. 16, 2003, now abandoned.

(51) Int. Cl.
*G01F 23/24* (2006.01)
(52) U.S. Cl. .................................. 73/304 R
(58) Field of Classification Search ............ 73/304 R
See application file for complete search history.

(56) References Cited

U.S. PATENT DOCUMENTS 4,785,665 A * 11/1988 McCulloch .................. 73/295
6,546,796 B2 * 4/2003 Zimmermann et al. ....... 73/295
2002/0100318 A1 * 8/2002 Maatuk ....................... 73/295

* cited by examiner

*Primary Examiner*—Hezron Williams
*Assistant Examiner*—Paul M West

(57) ABSTRACT

An improved apparatus and a method of measuring and interpreting reliably, simply and accurately the information on continuous liquid level, liquid temperature and other liquid properties within a vessel. The apparatus is suited for economical manufacturing and could be made of a powered heater element and temperature sensors that can be screen-printed, vacuum deposited, etched, welded, soldered or plated on one or both sides of a single rigid or a flexible substrate. The apparatus is compact and light weight and can be installed in relatively small liquid containers if necessary; Various parallel and serial configurations of thermocouples or temperature sensors can be used to measure the temperature along a heater. Simultaneous measurements from all the temperature sensors, before and after heat is applied, are used to generate accurate temperature profiles for the entire heater. Different features of the temperature profiles will determine accurately the liquid level, liquid temperature and other liquid properties.

13 Claims, 11 Drawing Sheets

LIQUID SENSOR AND ICE DETECTOR

This is a continuation of application Ser. No. 10/736,116 filed on Dec. 16, 2003 which is abandoned,

REFERENCE CITED

U.S. PATENT DOCUMENTS

U.S. Pat. No. 2,279,043 April 1942 Harrinigton - - - 073/295
U.S. Pat. No. 3,279,252 October 1966 Barlour - - - 073/295
U.S. Pat. No. 4,969,749 November 1990 Hasselman - - - 073/295
U.S. Pat. No. 2,702,476 February 1955 Boisblanc - - - 073/295
U.S. Pat. No. 3,360,990 January 1968 Greene - - - 073/25
U.S. Pat. No. 4,785,665 November 1988 McCulloch - - - 073/295
U.S. Pat. No. 4,603,580 August 1986 Waring - - - 073/295
U.S. Pat. No. 5,521,584 May 1996 Ortolano - - - 340/581
U.S. Pat. No. 4,819,480 April 1989 Sabin - - - 340/581
U.S. Pat. No. 4,570,230 February 1986 Wilson - - - 073/295X
U.S. Pat. No. 4,573,128 February 1986 Mazur - - - 073/295X
U.S. Pat. No. 6,546,796 April 2003 Zimmermann - - - 073/290R

FOREIGN PATENT DOCUMENTS

14926 October 1991 WO - - - 073/295
44923 March 1980 Japan - - - 073/295
158522 September 1982 Japan - - - 073/295
6116 January 1981 Japan - - - 073/295
281167 October 1993 Japan - - - 374/016
2035154 December 1977 Germany - - - 374/016

DESCRIPTION OF THE PRIOR ART

The invention relates to simple and reliable methods and light weight and compact devices used to measure liquid level as well as temperature and other liquid parameters, within a vessel or container. The devices of this invention is well suited for economical manufacturing and requires only a very limited space to accommodate it. Further, for containers with varying depth, the devices of this invention offer a wide degree of resolution of the level being sensed and may even accommodate increased resolution over a specific portion of the level range being sensed. The devices of this invention are made of a powered heater that can be used with various configurations of parallel and serial thermocouples or other temperature sensors. The power and signal conditioning circuitry, the powered heater and the thermocouples are easy to manufacture on one single substrate or multiple layer substrate. The power application and the sampling of the temperature along the heater will not cause the temperature measurements along the heater to be susceptible to errors from extended or extraneous electrical sources. The method of the invention can also be used with various technologies and not just powered heater and temperature sensors.

There are various applications where liquid level and other liquid parameters are required. For example, in a vehicle, the liquid level or height of fuel, coolant and oil is required. Moreover, the engine oil viscosity degradation is required too. In a boat, the fuel and water level need to be checked prior to a boat ride. Monitoring of oil level within a pump or compressors is required. In those applications, the liquid level sensor need to give a reliable, accurate measurement of the liquid level over an extended period of operation. Furthermore, the monitoring of the health of the sensor operation and its hardware, will require maintenance only when the sensor fails or its performance is degraded below an acceptable low threshold level of accuracy.

Different sensors have been used to determine liquid level in a container. Those sensors include a float, a single or multiple capacitors, hot wires, temperature sensors, ultrasonic and others. When these sensors are used to measure continuous liquid level, they require the liquid properties to be uniform as well as the properties of the medium above it to have uniform properties. Most of those devices are susceptible to outside electrical and magnetic noises.

The present invention precludes the shortcoming inherent in existing liquid level measuring devices and methods. Moreover, unlike existing thermal devices that use resistive probes to measure liquid level, in the device of this invention, the actual temperature at a strategically located points along the heater are used and processed, and the temperatures measured are dependent on heat transfer mechanisms rather than change in resistivity of the probe material. Furthermore, the invention is capable of not only determining liquid level at discrete points where the temperature sensors are located, but can also determine liquid levels at intermediate points between two temperature sensor locations, which the resistive type device is incapable of doing.

The power circuitry apply current to the common heater. The heat transfer mechanism creates a voltage gradient or a temperature profile along a heater wire or a strip. This profile is used to determine the discrete and continuous liquid level as well as other liquid parameters. In the prior art, U.S. Pat. No. 2,279,043 Harrington used heated liquids in a container to determine the discrete liquid levels with a set of discrete thermocouples. In U.S. Pat. No. 3,279,252 Barlow used heated cylinder to determine the discrete liquid levels. In U.S. Pat. No. 6,546,796 B2, the proposed configuration of discrete heaters or continuous heater with serially connected thermocouples use hot junctions that read the temperature at points close to the heater or the end of Copper traces between discrete heaters. The temperature of the hot junctions are controlled by heat profile along the copper traces between the discrete heaters. The heat transfer mechanism that generates the temperature profile is not the radiation but the convection of heat to the liquid and conduction of heat along the heater. The configuration proposed in U.S. Pat. No. 6,546,796 B2 will work only by proper selection of the single heater wire cross-section or the cross-section of the Copper traces between the discrete heaters. Moreover, the sum of voltages from the thermocouples will indicate reliably the continuous liquid level only when the entire liquid volume, except of the liquid boundary layer around the heater, has a uniform or close to a uniform temperature and simultaneously the temperature of all of the cold junctions are identical. Another limitation of the device described in U.S. Pat. No. 6,546,796 B2 is the fact that it can measure reliably the continuous liquid level only when linear thermocouples are used.

In this invention, a method is presented to overcome those limitation by creating a desired profile along either a separate heater and discrete thermocouples or a heater that is also used as a common wire for a set of discrete thermocouples.

In other words, the separate heater is eliminated and instead, the common wire of the thermocouple set is also used as the heater.

In U.S. Pat. No. 4,573,128 Wilson and U.S. Pat. No. 4,573,128 Mazur used a poured molted liquid in a container to obtain a profile and measure the liquid level in a container. In this invention, I apply heat to the surface of a heated wire to obtain a profile along the wire.

This invention also detects ice on a surface by looking at a phase change effect ("Igloo") and temperature profile. In U.S. Pat. No. 5,521,584 Ortolano detect ice by measuring heat flow and heat measurement.

SUMMARY OF THE INVENTION

The invention described herein is a means of measuring the level of a liquid in a liquid container such as a fuel tank by means of a probe to which heat is applied and the temperature along the length of the probe is measured. This invention makes use of the difference in cooling efficiency between liquid and gas such as air, or between two different liquids, such as water and oil. When heat is applied to the probe, the temperature of the portion of the probe submerged in liquid is significantly lower than the temperature of that portion of the probe outside of the liquid and typically exposed to air. This is because the liquid removes heat at faster rate than air, so that the temperature difference between the surface of the probe is much lower in liquid than it is in air. This is also true between a liquid that removes heat more efficiently, such as water, and a liquid that does not remove heat as efficiently, such as oil. Temperature sensors, such as thermocouples or thermistors that are attached to various points on the probe to measure the temperatures at those respective locations on the probe. This invention is not only capable of determining accurately where the liquid level is at discrete points where the temperature sensors are attached. It can also determine where the liquid level is between two discrete points to within a fraction of centimeter accuracy, when precision temperature measurement devices and electronic circuitry are used in conjunction with suitable microprocessor, which collects and process the signals received from the temperature sensors.

The purpose of this invention is to provide a device that can measure liquid levels, such as that of fuel in an automobile fuel tank or lubrication oil level in an automobile engine compartment fairly accurately and with minimal effort, such as simply pushing a button on an instrument panel, as shown in FIG. 1. The advantages of this invention are (1) It can measure continuous and discrete liquid levels accurately, within a fraction of a centimeter; (2) The power and signal conditioning circuitry, the powered heater and the thermocouples are easy to manufacture on one a single substrate or multi-layer substrate; (3) the device can monitor over an extended period of time, the health of the probe, the electronic hardware and software and thus eliminate the need for periodic maintenance; (4) It requires a very small amount of power to operate; (5) It is compact and light weight and can be installed in relatively small liquid containers if necessary; (6) It is reliable since it has no moving parts; (7) because it requires a very small power for operation, it does not generate any significant amount of electromagnetic energy which could interfere with the performance of other electrical electronic equipment; (8) the same power circuitry, signal conditioning circuitry and signal processing can be used to achieve the same accuracy of the liquid level for containers with varying depth; and (9) with certain modifications to the device, it can be used to measure other important liquid parameters such as viscosity and density. This device can also be adopted for the detection of ice formation on the external surface of a road or an aircraft, such as the external surface of an aircraft wing or fuel tank.

Additional features and advantages of the invention will be revealed in the following description, appended claims and drawings. The invention covers all new characteristics, which maybe inferred therefrom even if they are not expressly stated in the claims. The invention is depicted in a plurality of exemplary embodiments in the drawings.

DETAILED DESCRIPTION OF THE INVENTION

Figure 1:
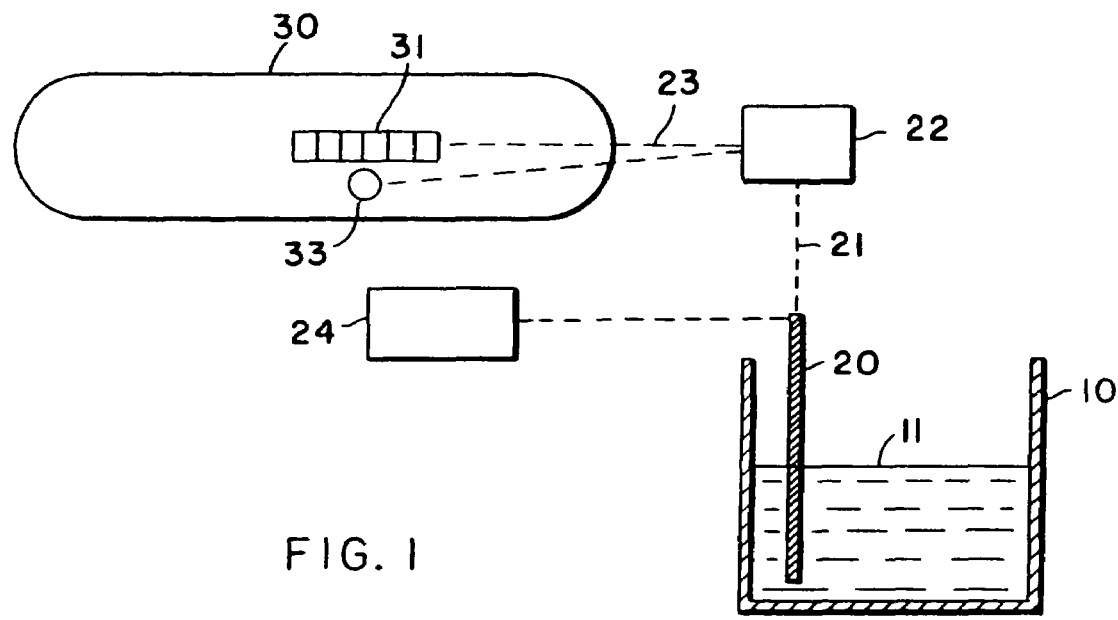
FIG. 1 is a schematics of a typical liquid level measuring device application.

The present invention describes a new method and a new sensor that measure accurately the liquid level, absolute temperature, viscosity degradation and density and pressure of compressible fluid in a three dimensional liquid container. The method requires the development and use of a profile or a mode shape along an axis. The profile has three components. First, a horizontal line for the section of the sensor that is in liquid. Second, a horizontal line for the sensor section that is in the medium above the liquid. Third, a curved line that connects the two horizontal line. This curved line can be viewed as a wave shape. The curved line length is a fraction of the height of the liquid container. The point of intersection between the wave and the first horizontal line tracks the motion of the liquid level. The height of the first horizontal line, height of the second horizontal line or the changes in the slope and curvature of the curved line are used to determine accurately the liquid level, absolute temperature, viscosity degradation and the density and pressure of the compressible (gas) fluid in a three dimensional liquid container.

The present invention also describes a new method and a sensor to detect ice on surfaces. This method requires the development and use of the parameters of the "Igloo Effects". Those parameters include the time delay due to latent heat for a phase change from ice to liquid, steady-state response inside the "Igloo" and the response time inside the "Igloo".

One possible way of developing a profile is to use a sensor made of a heater element, temperature sensors that measure the temperature at a few points along the heater element and a data acquisition and processing system. First, the temperature sensors measure the temperature along the heater at a few points prior to applying power. Second, The temperature sensors measure the temperature along the heater at the same few points after power is applied to the heater. The difference between the first and second temperature measurements give the amplitude of the temperature rise at the points along the heater. Those amplitudes will be used to construct the three components of the profile. Each of the horizontal lines in the profile are obtained by using the amplitude of one or more temperature sensors. The curved line of the profile is obtained by using the amplitude of two or more temperature sensors located immediately above the liquid level.

The heater element (maybe wire, ribbon etc.) has uniform, linear or non-uniform geometry (cross-section). This geometry will determine the amplitude characteristics (distribution) in the three components of the profile. The temperature sensors can be resistor type, thermistor, thermocouples and others.

The heater element can be separate from the temperature sensors or part of the temperature sensors. If the selected temperature sensors are thermocouples connected in parallel with a common wire, then the common wire of the thermocouples can also be used as the heater. When the common wire of the thermocouples is used as a heater, it can be heated directly (e.g. flowing a current through the common wire when not measuring the thermopotentials) or the common wire of the thermocouples can also be heated indirectly (e.g. laminating an electrically isolated heater over the temperature sensing common wire to form independent heating and measuring processes) to image the heat flow characteristics along the heater.

The packaging and materials, and the locations of the thermal sensing taps, are engineered to properly sample the thermal gradients along the heater element. An analog (spatial) profile of the amplitudes of temperature rise along the heater is reconstructed from these samples, and this analog profile may be processed to accurately discern levels, layers, properties (like viscosity, kind of liquid), etc. in the strip's boundary layer environment.

The instrumentation electronics need only be capable of microvolt measurements, plus analog or digital processing as appropriate to the application. Scanning the taps in sequence may be used to transform the information of the analog spatial profile into the time domain for simple analog filtering to reconstruct the profile, and thresholding circuits for decisions. Equally, digitizing the data from the sensing taps allows digital processing, possibly for more elaborate signature analysis, for ease of recalibration, etc. Output circuits and format may be whatever is appropriate to the application (e.g. digital dashboard, analog level meters, warning lights, etc.).

Using the reading from all the point sensors to make discrete decisions as to (for instance) a liquid level are easy to make based simply on comparing the individual measurements to each other. For example, this comparison can be done by looking at the amplitude of the voltage of different individual thermocouples or amplitude of the difference between two adjacent thermocouples. For an environment where the fluids (or whatever is being tested) have substantially dissimilar properties (e.g. air/water), the data also readily supports simple interpolation between points, with increasing accuracy requiring the shaping of the heater geometry, the thermocouples configuration as well as increasing the accuracy of resolving the end-points and increasing the complexity of the interpolation algorithm. For example, three thermocouples configurations can be used. First, serially connected with hot junctions along the heater and cold junctions are connected with isothermal blocks away from the heater. Second, parallel thermocouples with common with hot junctions along the heater and a single cold junction away from the heater. Third, similar parallel configuration but all of the hot junctions are connected to a single point. The third configuration will average the thermopotential reading from all of the hot junctions.

Using a microprocessor in addition to signal conditioning circuitry, give substantial improvement in the decision accuracy, by incorporating the data from multiple points, rather than just the two points on either side of the fluid boundary or just the total sum of the thermopotentials of all of the thermocouples or the average value of all of the thermopotentials. By using many data points to fit the profile along the strip, the accuracy of the overall curve is improved beyond the accuracy of single measurements, the individual measurement uncertainties tend to average out. Further, the fitting of multiple points to a model that incorporates the effects of different fluid characteristics and heat inputs allows substantial improvements in discerning boundaries between fluids that are more closely matched in properties (e.g. water/oil) and in discerning the properties of the fluids themselves (e.g. viscosity).

A typical application of the liquid level measuring apparatus is measuring the liquid level of fuel in an automobile fuel tank or lubrication oil level in an automobile engine compartment, A schematic diagram of such an application is shown in FIG. 1. The schematic diagram in FIG. 1 depicts an automobile engine oil pan 10 containing lubrication oil 11. The liquid level sensor probe 20 is installed inside the oil pan 10. A plurality of electrical wires 21 connect the probe 20 to data acquisition and processing system that can be connected to a microprocessor which may be located in the engine compartment of the automobile or behind the automobile instrument panel 30 or very close to the probe. The data acquisition and processing circuit is in turn connected by one or more wires 23 to an analog or digital display 31 located on the automobile instrument panel 30. The data acquisition circuit and the microprocessor is situated with respect to the probe as appropriate for the noise and cabling constraints of the application environment. A pulsed power supply 24 made of one or two batteries or AC is located either in the engine compartment, behind the automobile instrument panel or close to the probe and electrically connected to the data acquisition and processing system 22, the probe 20 and an activation button or switch 33 located on the automobile control panel, provides pulsed electrical energy to the liquid level sensing system. Sensing of the lubrication oil level is accomplished by activating the button or switch 33, sending pulsed electrical energy to the probe 20 and the microprocessor 22. The lubrication oil level is displayed on the display 31.

Figure 2:
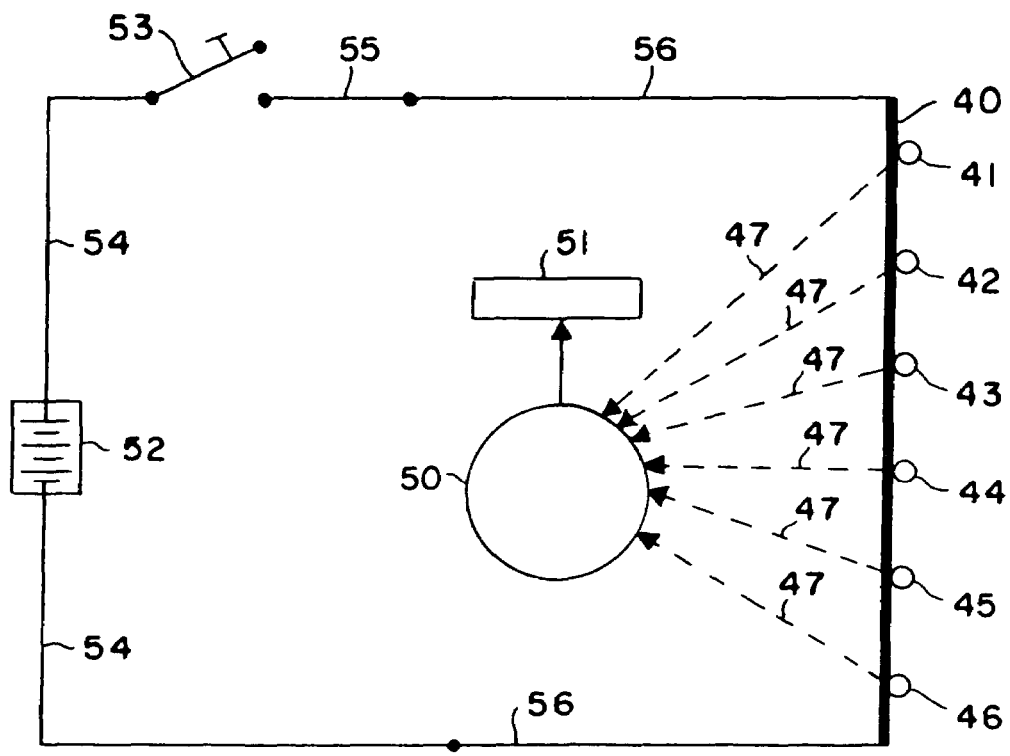
FIG. 2 is a schematic diagram of one embodiment of the invention.

The apparatus makes use of the cooling efficiency between liquid and gas, such as air, or between two different liquids such as water and oil. One embodiment of the invention is depicted schematically in FIG. 2. The embodiment depicted schematically in FIG. 2 is comprised of a probe 40 made from 0.002 inch diameter Nichrome heater wire three inches in length but maybe of any suitable lengths, a data acquisition circuitry and a microprocessor 50, a display 51, an electrical power source 52, a switch 53, electrical wires 54 and, wires 56. Six thermocouples beads 41, 42, 43, 44, 45 and 46 from 0.008 inch diameter or Copper-Constantine pairs of wires are attached to the probe 40 by wrapping the probe Nichrome heater wire around the thermocouples beads 41 through 46. The number of thermocouples beads may be varied depending on the length of the probe and the accuracy desired. The thermocouples 41 through 46 are electrically connected to the data acquisition circuitry by a Copper-Constantine wires 47 of suitable size and length. The probe 40 is coated with an insulative material to electrically isolate it from the thermocouples beads 41 through 46. This coating is also chemically inert with respect to the liquid.

Referring again to FIG. 2, when the switch 53 is in the open position and no power is applied to the probe heater 40, the temperature of the thermocouples 41 through 46 will measure the same temperature as the media which surrounds the probe, either air or liquid or both. When the switch 53 is in the closed position, a pulsed current flows through the circuit including the probe and heat is generated at the probe 40 in the form of —$I^2R$— losses. The heat generated at the probe 40 is dissipated to the surrounding medium. In order for heat to be dissipated to the surrounding medium the temperature of the probe has to be higher than that of the surrounding medium. At steady-state condition, that is when the temperatures have stabilized some time after the switch 53 is closed, usually several seconds, the characteristics temperature difference between the medium and the probe 40 is established. For example, if 6.0 milliwatts of power is applied to the probe and the entire probe is in air which is maintained at a constant temperature of 20 degrees C., the temperature at the thermocouple location 41 through 46 are approximately 35 degrees C., or approximately 15 degrees C. higher than the temperature of the surrounding air when steady-state condition is reached. If the entire probe is immersed in water, also maintained at 20 degrees C., the temperature of the probe at the thermocouples 41-46 locations will only be slightly above 20 degrees C. The actual temperatures at the thermocouples locations are found in Table 1. This is because water can remove heat from the probe at much faster rate than air.

Figure 3:
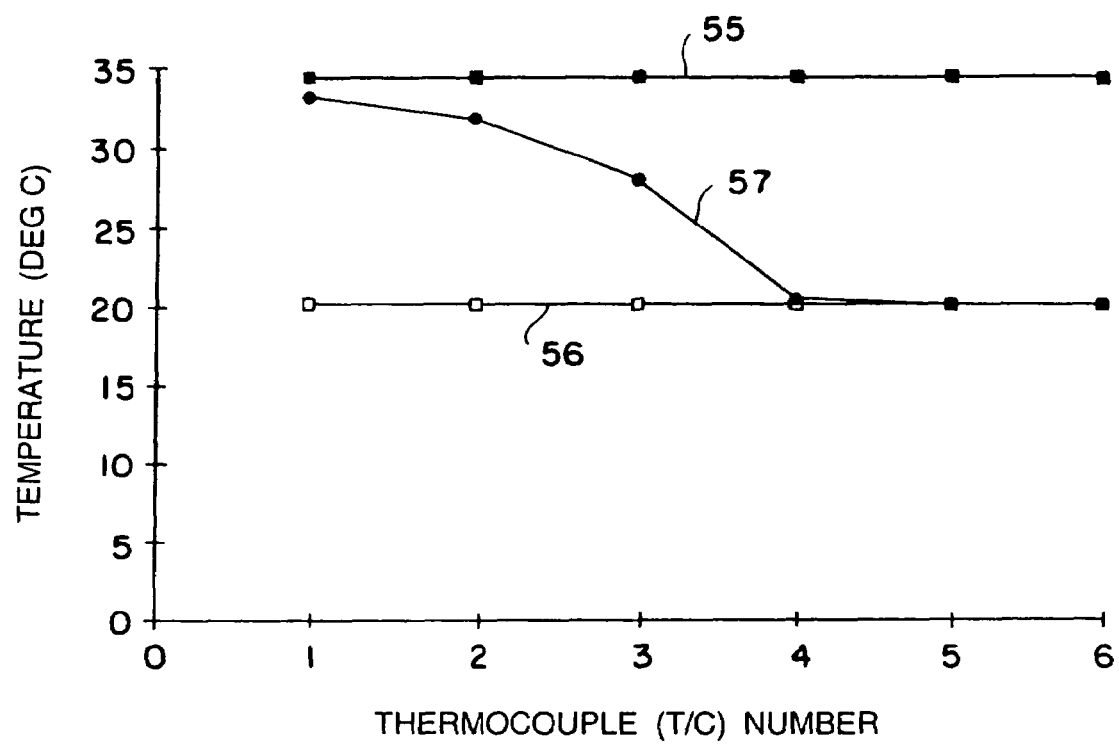
FIG. 3 Probe temperature profile.

So the water requires only a small temperature difference (less than 1 degree C.) to remove the same heating rate as the air has to remove. In FIG. 3, the temperature profile of the probe is shown for three conditions: (1) where the entire probe with 6.0 milliwatts power is in air whose temperature is 20 degrees C. (55), (2) where the probe is completely immersed in water whose temperature is 20 degrees C. (56), and (3) where the probe is immersed in water from thermocouples location 43 to 46, with both air and water maintained at 20 degrees C.

Figure 3A:
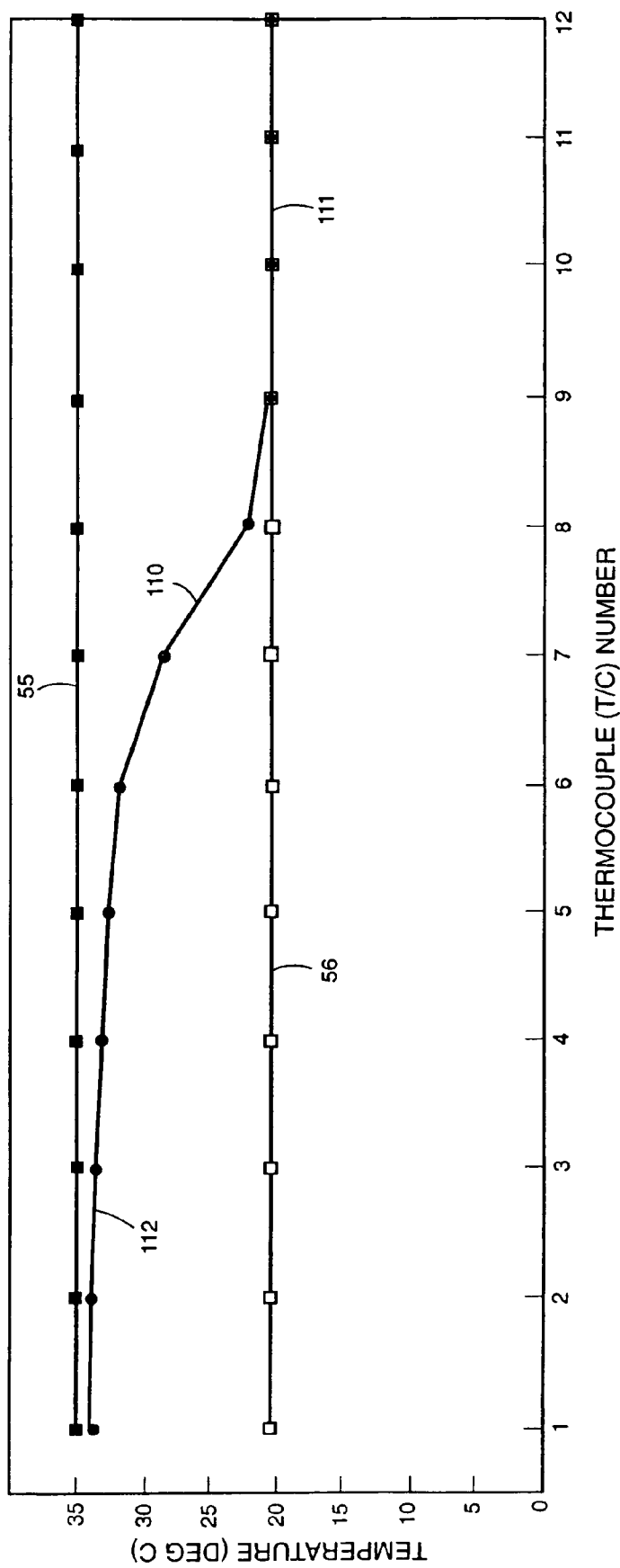
FIG. 3a Generic Probe temperature profile.

FIG. 3a shows a typical temperature profile of a 6 inch probe 20 with 0.5 inch spacing between the thermocouples. This profile is made of three sections: (1) section 111, which is the temperature profile of the probe section that is immersed in liquid below the liquid level point. (2) section 112 which is the temperature profile of the portion of probe 20 that is in air (or other medium) but some distance above the liquid level. (3) section 110, which is the curved portion of the temperature profile of probe 20. By proper design of the geometry of the probe heater 40, this curved section of the probe profile can be designed to be shallow or steep. Similarly by proper design of the shape and geometry of the heater, the curved section of the profile could also become linear or non-linear curve.

One of the main features of this invention is the use of a sliding profile along the heater of a sensor as a method to determine accurately the liquid level and other liquid parameters. The control of the shape and geometry of a probe will result in a desired profile that among other things, will simplify the data processing needed to determine liquid level and other liquid parameters. A desired profile along the probe, can be achieved not only with a heater but also with other technologies. For example, controlling the shape and geometry of the reflection and refraction surfaces of optical technology will control the desired profile (i.e. linear profile) along an optical probe. Similarly, in capacitor technology for measuring liquid level and other liquid properties, the electrodes can be shaped as thin and narrow (instead of uniform) to shape the profile of the dielectric field along the capacitate probe.

In this example heat is transferred from the surface of the probe to the surrounding medium by free convection. The basic convection heat transfer equation (applicable to both free and forced convection) is $$Q=HA(Tp-Tm) \quad (1)$$

Where Q is the heat transfer rate

H is the convection (free convection in this case) heat transfer coefficient.

A is the area of the probe exposed to the medium

Tp is the temperature of the probe surface exposed to the medium

Tm is the temperature of the medium (air or water in this example)

The temperature difference between the probe surface and the medium is expressed as DT or $$DT=Tp-Tm=Q/(HA) \quad (2)$$

In this example the values of Q and A in equations 1 and 2 are held constant. Only H, which is a measure of the heat transfer coefficient or heat removal efficiency, is varied. The higher H is the lower DT is. Water, which is a good heat transfer liquid, usually orders of magnitude better than air in removing heat from the probe both by free convection and forced convection. Therefore it requires a very small DT compared to that required by air in removing the same amount of heating rate or power.

When only liquid levels at discrete locations are desired, such as where the six thermocouples 41-46 are located, the processing of the temperature data becomes relatively simple. The points (thermocouple locations) that are completely immersed in water will indicate a much smaller DT. For example, if thermocouples 44, 45 and 46 are completely immersed in water and thermocouples 41, 42 and 43 are in air, the temperature of the six thermocouples 41-46 will not be constant. The DTrs of the thermocouples immersed in water will be much lower. The temperature distribution along the probe when the thermocouples 41, 42 and 43 are in air and when thermocouples 44, 45 and 46 are immersed in water are shown as 57 in FIG. 3. From comparison of the difference in temperatures of the six thermocouples 41-46 to each other, it can be determined which thermocouples or discrete points are immersed in water.

Figure 4:
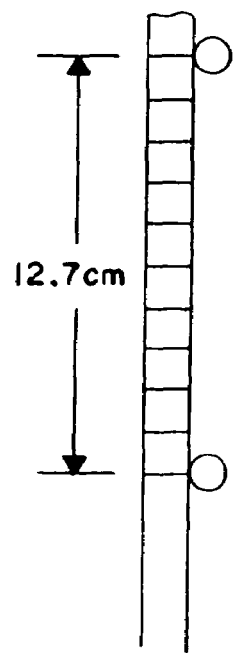
FIG. 4 Division of space thermocouples 43 and 44 into the equal increments for intermediate level reading.
Figure 5:
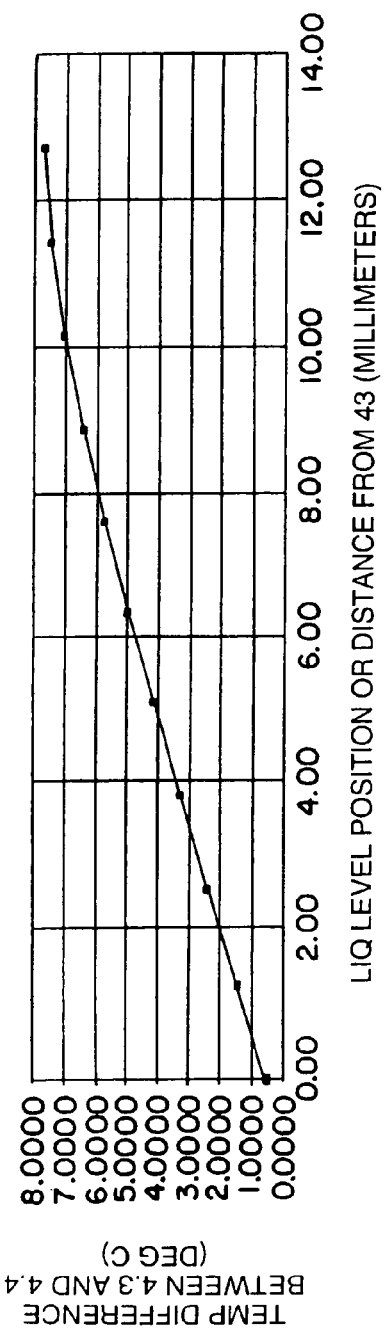
FIG. 5 Temperature difference between thermocouples 43 and 44 versus liquid level position between 43 and 44.

The invention can also be used to determine the liquid levels at intermediate points between the thermocouple locations. Supposing the liquid level is somewhere between thermocouple 43 and thermocouple 44 and it is desired to determine the location of the liquid level within 1.3 millimeter. The space between thermocouple 43 and thermocouple 44 of the probe heater 40 in the embodiment depicted in FIG. 2 is 12.7 millimeters. If the space is divided into ten equal spaces as shown in FIG. 4, the distance between each intermediate mark is 1.27 millimeters, within the 1.3 millimeter accuracy desired. Referring to FIG. 2 and FIG. 4, as the level of the water is varied from thermocouple 43 (o distance from thermocouple 43) one intermediate mark at a time to thermocouple 44 (12.7 millimeter distance from thermocouple 43), the actual temperature of thermocouple 43 and thermocouple 44 and the difference between the two temperatures will vary, as shown in Table 2 and FIG. 5. These data can be collected and processed by the microprocessor to where the actual liquid level is. The thermocouples or equivalent temperature sensors used to measure the temperatures at the various locations will have to be able to provide much more accurate readings than when only discrete temperature levels are being measured. This can be accomplished by using the entire spatial profile of differential rather than absolute thermocouple readings. Using proper data acquisition and processing circuitry together with a proper algorithm in a microprocessor, the non-random electronic errors can be eliminated and the amplitude of the random errors can be minimized. In the present invention, the use of averaging of individual thermocouple reading together with a correlation function for a simultaneous few thermocouples has minimized the impact of error amplitude in individual thermocouples on the accuracy of calculating liquid level and other liquid parameters.

The performance characteristics of the invention with other liquids such as gasoline fuel or engine lubrication oil will be similar to that of water. However, in the case of liquids like lubrication oil, which have lower heat removal efficiency than water, but much higher than air, either more precision temperature measuring devices or more sophisticated signal conditioning or both, may be required to achieve the same overall performance of signal to noise ratio, because the temperature difference between thermal sensors may not be as pronounced as that when water is used. Instead of keeping the same signal to noise ratio for liquids with different heat removal efficiency by using more accurate temperature sensor (reduce the noise), it is possible to keep the same overall performance by driving the sensor to a given temperature response. However, for some applications like oil/water or liquid/vapor. The choice of driving the sensor to a given temperature might be constrained and temperature sensors with smaller uncertainty (random error amplitude) need to be used to achieve the same overall performance.

The invention describe herein is one configuration. Other configurations, such as probe heater in the shape of very thin metallic strips together with serial or parallel thermocouple configurations, can be deposited on a printed circuit board. The data acquisition and processing circuitry together with a microprocessor can also be mounted on the same circuit board. The principle of operation of the probe heater and the use of the resulting profile to perform accurate measurement and calculations of liquid level together with other liquid parameters, is the novel feature of this invention, and it applies to other heater and temperature sensors configurations.

Figure 6:
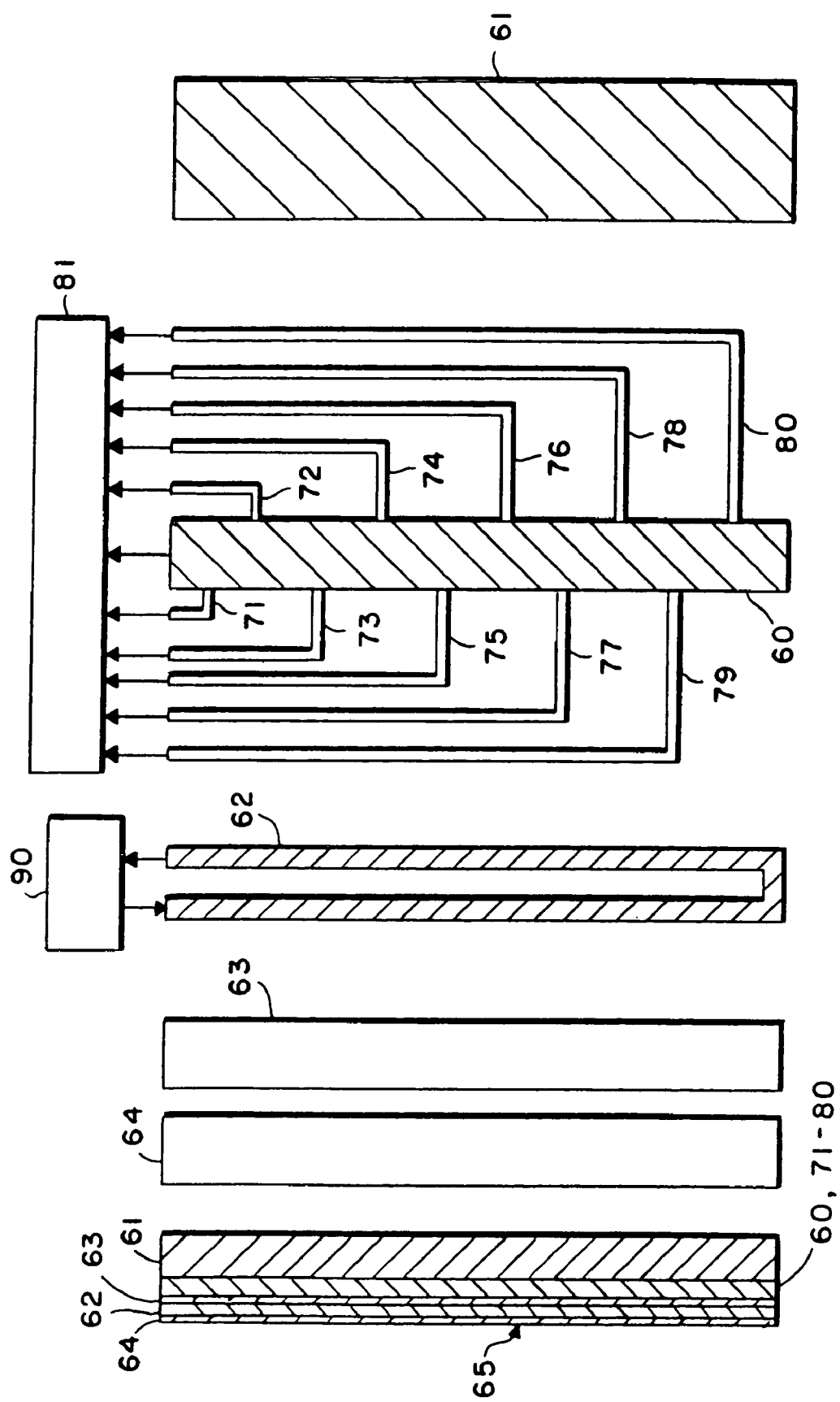
FIG. 6 Another embodiment of invention employing a strip probe.

Another embodiment of the apparatus claimed in this invention is metallic strip or a wire version of the probe heater of FIG. 2 and parallel thermocouple configuration, which is depicted in FIG. 6. The probe heater is comprised of a strip or wire of Constantan attached to a fiberglass or a film substrate or a plastic sheet, or an equivalent printed wiring board material 61, a series of Copper pads (taps) 71 through 80 also attached to board 61 and electrically connected to a Constantan strip 60 to form the hot junctions of a parallel thermocouple connections herein referred to as the thermocouple network, a heater strip 62 also attached to board 61 but electrically isolated from said thermocouples network with a thin dielectric film 63, and a second thin dielectric film 64 electrically isolating the heater strip 63 from the air or liquid to which the probe is exposed. A DC or AC power source 90, provides pulsed electrical energy to heat the heater strip 62. The thermocouple networks senses the probe temperature at various points along the probe and sends the appropriate electrical differential voltage signals from the thermocouples to the data acquisition and processing with a microprocessor 81. The precise liquid level location can be calculated by processing the signals and determining the corresponding temperature profile along the probe.

Figure 9:
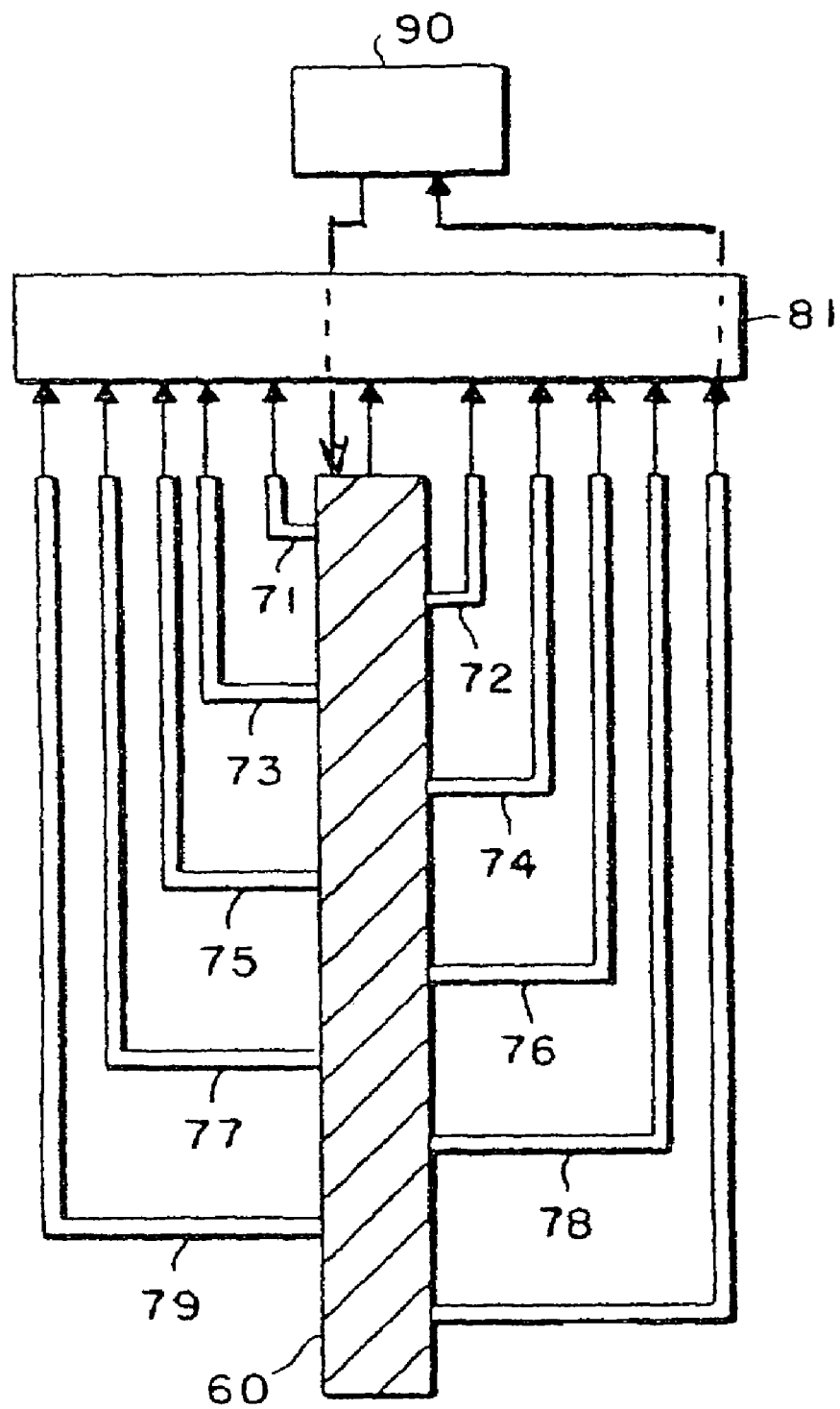
FIG. 9 Another embodiment of invention employing a common strip and heater probe.

Another variation of the apparatus claimed is a modified strip design of FIG. 6 as shown in FIG. 9, whereby the Constantine strip (60) is used as the heater that is heated by power supply 90 as well as the common wire for the thermocouples. Such a design will eliminate the heater and the thin layer that electrically insulates the heater from the thermocouple junctions. This modified design of FIG. 9 will also have smaller thermal mass and thus faster response time than the probe of FIG. 6. In other words, for the same power, the signal of FIG. 9 will be bigger than the signal in FIG. 6. The power to the probe of FIG. 9, will be applied to the Constantan strip as a set (cycles) of many short on and off pulses. The duration of the pulses is very small compared to the time constant of the heater. For example, if the heater has a time constant (response) of 1 second, we can apply the heat cycles as equal or non-equal pulses of a few milliseconds. During the on portion of the heating power cycle there will be no measurement taken by the thermocouples. During the off portion of the heating cycle, the temperature measurement from all of the thermocouples along the probe will be taken. Those measurements can be taken a few times (during the off portion of the power cycle) to minimize the random errors by using time-averaging of the reading from each thermocouple.

The heater and the parallel thermocouples of FIG. 9 can be easily manufactured and mounted on a single board or layer. The electronic circuitry of power circuit, data acquisition and the microprocessor can also be mounted on a single board.

Instead of measuring the individual temperature along a heater to determine the continuous liquid level an average of those reading can be used. Using the average reading from all of the hot junctions in FIG. 9, by connecting all of the Copper traces of the hot thermocouples junctions (i.e. 71 to 80) to a single point will simplify the electronic hardware and eliminate the need for a microprocessor for the embodiment of the sensor that uses parallel thermocouple configurations. However, such an embodiment is dependent (sensitive) to the variations in the electrical resistance of the copper traces as well as other factors like the uniformity of the properties of the liquid and the medium above it.

The continuous liquid level can also be determined by adding the voltage from the individual temperature sensors along the heater. Selecting thermocouples that are serially connected can do this addition of voltage or temperature. While such an embodiment is easier to manufacture and has lower cost electronics, such embodiment has limitations and drawbacks. For this embodiment to give any level of accurate continuous liquid level reading, it needs to have all of its cold junctions connected by isothermal blocks and the liquid and the medium above it must have uniform properties. Measuring of any other liquid property (i.e. individual temperatures along the heater) will require additional separate circuit for each liquid parameter.

It must be emphasized that the use of the heater temperature profile is the reason that the signal to calculate continuous liquid level is generated. The various thermocouples configurations allow different steps in the signal processing and not in the signal generation.

In all of the embodiments of thermocouples configurations, the thermocouple junctions are formed between the leads (traces) of both legs, with suitable thermal, electrical and chemical insulations to keep measurement data from each thermocouple junction clean and the probe stable.

The two elements of the thermocouple in each embodiment can be comprised of Constantan as one element and the Copper as another element. However, other type of elements for thermocouple can also be used to form the thermocouples in FIG. 6 or FIG. 9. For example, exotic material like Zinc-Antimony (to replace the Constantan) can be used to increase the voltage reading from the thermocouples. The thermocouple that uses Zinc-Antimony as one of the thermocouple elements, will approximately give a signal that is 25 times the signal from the thermocouple that uses Copper and Constantan. One of the big advantage of using a thermocouple that uses Constantan and Copper is the fact that the voltage readings from such a thermocouple is linear for a wide range of operating temperature. This linearity of the thermocouple over a wide range of operating temperature range, is one of the requirements for making the sensor accurate and self-calibrated.

The basic embodiment of a simple two-metal strip (e.g. Constantan with Copper taps) eliminates the need for specialized thermocouple electronics. Traditional systems that employ thermocouples use "cold junction compensation" to yield an absolute temperature measurement, then process that data. The tapped strip approach simplifies this to a data set that is entirely composed of differential temperature measurements. The absolute temperature along the strip is not needed for the basic level-sensing applications, but is readily added with a discrete sensor at a single location along the strip if desired. Further, by reducing the probe to an entirely copper interface, the complications and cost of bringing out a dissimilar metal lead is avoided.

The top and bottom layers of the probe of FIG. 6 or 9 can be made of thermoplastic material and those two layers together with a Copper trace pattern and a strip of Constantine can be clamped together and put in a thermal chamber for a short time and at this way make the thermocouple junctions without using soldering or ultrasonic welding as well as eliminate the need to bond the two layers with adhesive that most likely will dissolve in fuel or other liquids.

In addition to using lamination technology to produce the probe in FIG. 6 or 9, this probe can also be produced using the production methods of vacuum deposition, screen printing, molding or a combination of those methods. For example, the Copper and Constantan can be screen printed on a substrate. The electronic data acquisition system can also be mounted on the same substrate. Then the entire sensor can be coated by depositing a thin coating material that is hydrophobic (or oil phobic) and slippery as well as give electrical insulation. Another method of coating such a sensor is to screen print the electronic hardware with a buffer coating and then screen print the entire sensor with a thin coating that is hydrophobic, slippery, chemically inert and electrically insulating.

The invention can also be used to determine the kind of liquid from a set of liquids. For example, determining the kind of fuel in a fuel tank from a set of fuels. The method of determining the kind of fuel will be based on three parameters that are shown in FIG. 3. The first parameter is the height or rise of line 56 in FIG. 3 above the liquid temperature after a given amount of power is applied to the liquid for a given amount of time. The second parameter is the difference between line 55 and 56 in FIG. 3 after a given amount of power is applied to the probe after a given amount of time. The third parameter is the curvature of line 57. If we use only the first parameter, it will be hard to determine which liquid to select since two different liquids with the same thermal convection will raise the reading from the thermocouples that are in liquid by the same amount. However, the transfer of heat across the boundary between the liquid and air or two other liquid mediums will be different and thus the second and third parameters (for two different liquids that have the same thermal convection) will also be different.

The invention can also be used to determine the density and pressure of the compressible fluid above the incompressible liquid. For example, measuring the pressure variation in a sealed compressor. As the pressure changes, the density of the compressible fluid changes in a direct relationship. When a probe with a heater is inserted inside a container with compressed fluid above he incompressible liquid, the section of the heater that is in the compressed fluid will have a higher temperature rise than the section in the incompressible liquid. This temperature rise is shown as line 55 in FIG. 3a. As the density of the compressed fluid changes, the height of line 55 will change. The increase in the pressure of the compressible fluid will increase the density of the compressible fluid, which in turn will decrease the height of line 55 in FIG. 3a. Moreover, The lowering of the height of line 55 in FIG. 3a will also change the curvature of the curved line 110 in FIG. 3a. In other words, the changes in the pressure of the compressible fluid can be determined by either of two portions of the temperature profile (i.e. height of line 55 and curvature variation in curved line 110).

Experiments performed on a prototype similar to the configuration described in FIG. 2 indicated similar temperature profile trends as those predicted analytically, although the precision was not close to analytically predicted precision. This is because the sensors used in the prototype did not have the accuracy required for such precision.

Figure 7:
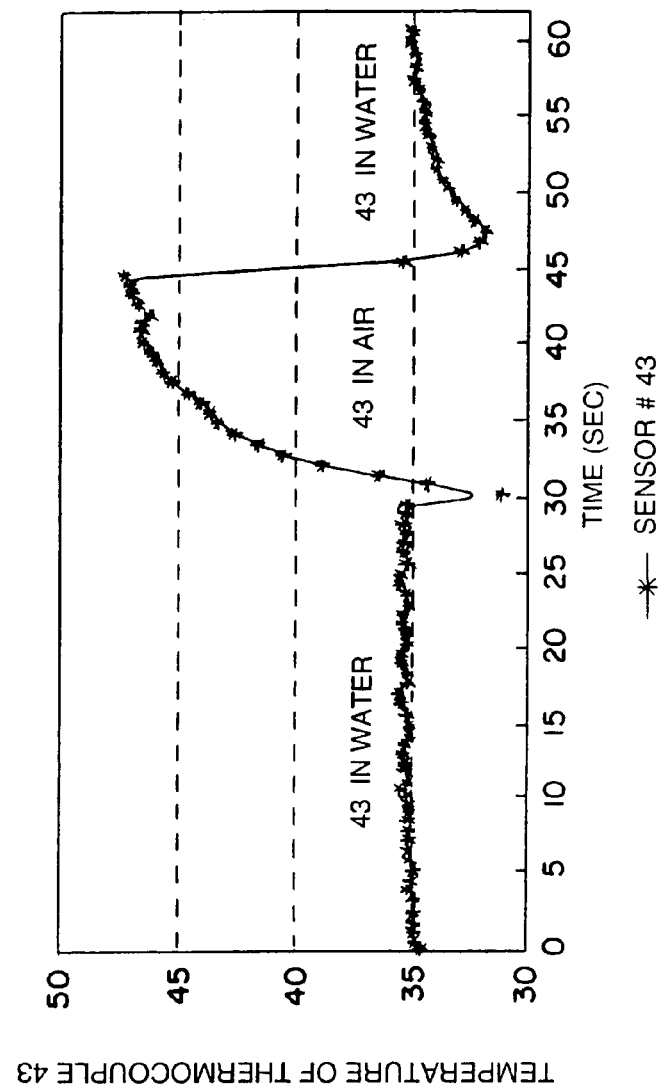
FIG. 7 Temperature behavior of 43 when initially immersed in water and then exposed to air FIG. 8 Temperature behavior of 44, 45 and 46 in water while 41, 42 and 43 in oil.

The same experiments also indicated that the probe temperature momentarily dips in temperature when exposed to air after being immersed in water, is shown in FIG. 7. This is because the small amount of water entrained on the probe is evaporated, causing the temperature to dip. As the entrained water has been evaporated, the temperature of the probe then rises to the level of that when it is in air. These characteristics of the probe could be employed in the detection of ice formation on the external surface of an aircraft, because when the sensor is in ice, it is normally insulated thermally from the surrounding air or water, and the probe temperature is expected to rise. The heat required to change the ice to water will appear as a time delay on this sensor. This time delay will be one of three parameters that will be used to detect ice with this sensor.

Figure 10:
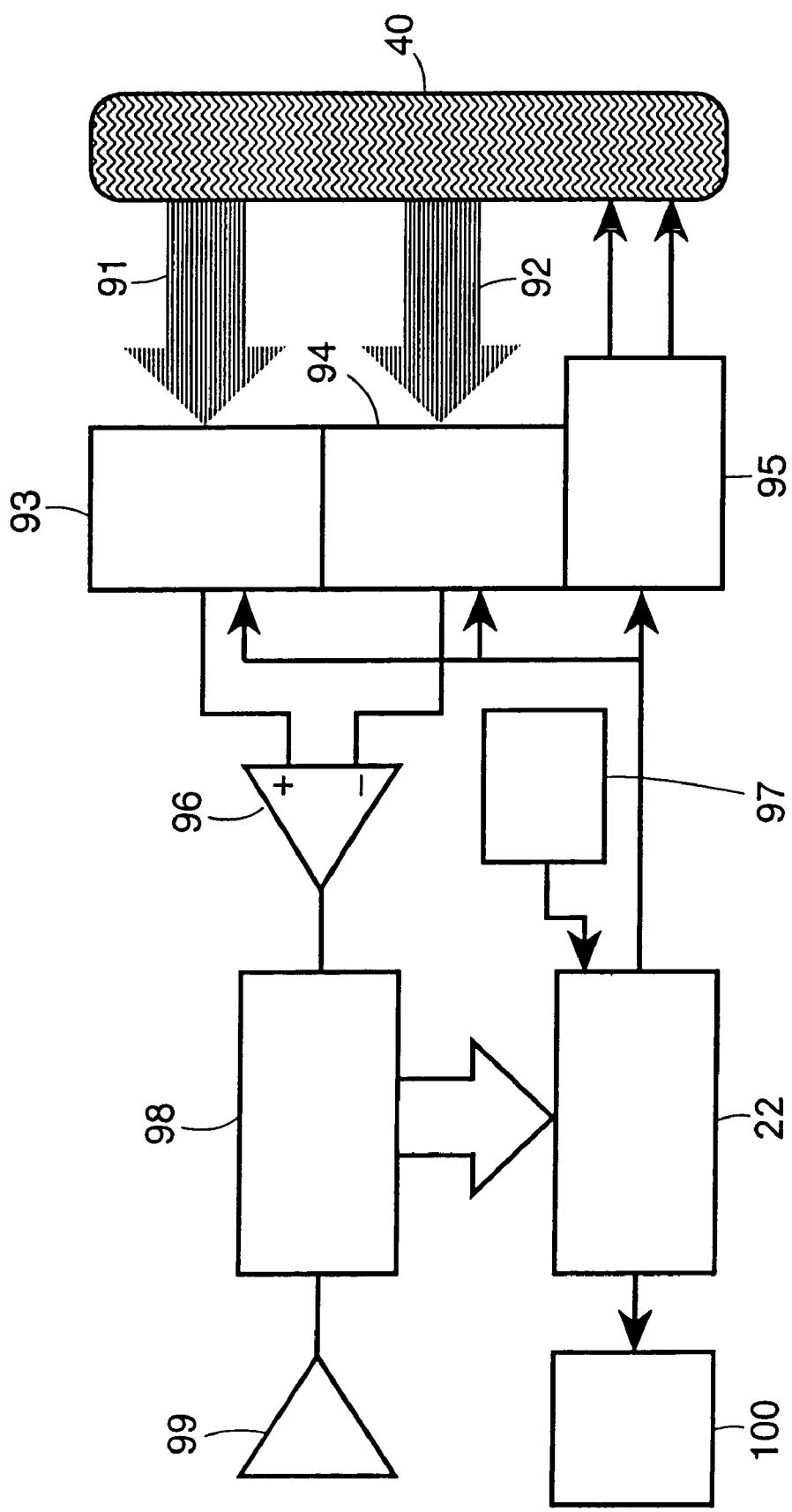
FIG. 10 Data Acquisition.

FIG. 10 shows the Data Acquisition that was developed for this probe. In this figure, 40 is the probe with the thermocouples and 22 is the microprocessor, which controls the entire data acquisition as well as the software and the electronic circuitry for monitoring the health of the probe and the entire electronic hardware. The microprocessor, 22, commands the power supply 95 to apply power to the probe 40. Subsequently, the microprocessor commands the multiplexers 93 and 94 to scan and measure the analog thermocouple voltages after the power is applied. To eliminate non-random errors in the thermocouple readings, that are caused by the electronic hardware and the connections, the scanning of the thermocouples is not done sequentially. For example, let us say that we have a probe with 11 thermocouple junctions. One of the thermocouple junctions (i.e. the Copper wire of the first junction between this Copper wire and the Constantan) or the Copper trace from another point on the probe that is not a hot thermocouple junction (but is a junction between the Constantan and a Copper trace), can be used as a reference point 0. The wiring between the probe and the multiplexers are such that a Copper wire goes from the reference point 0 to multiplexer 93 and another Copper wire goes from the same reference point to the second multiplexer 94. The Copper wires from all of the odd thermocouple junctions will go to multiplexer 93 and all of the Copper wires from the even thermocouple junctions will go to multiplexer 94. If thermocouple junction 1 is selected as the reference point 0, Then all 5 Copper wires from the odd thermocouple (3, 5, 7, 9, 11) junctions and the one wire from the reference point 0 will go to multiplexer 93. Similarly the multiplexer 94 will also have 6 wires. 5 from the Copper traces of the even thermocouples and one wire from the reference point 0. The first measurement that is done is the voltage difference between the Copper trace of the reference point 0 (V0) on multiplexer 93 minus the voltage reading of junction 2 (V2) on multiplexer 94. Assuming the total non-random (bias, slow drift etc.) on the lines and connections leading to multiplexer 93 is e1 and for multiplexer 94, the total non-random error is e2. The differential voltage reading for each thermocouple junction will come through differential amplifier 96 whose non-random errors are self-calibrated. The sequence of sampled voltage differences for each thermocouple junction will go from the differential amplifier 96 through Analog to Digital Converter 98 which is powered by 99. The first differential voltage reading is equal to:

$$V0+e1-(V2+e2) \quad (3)$$

The next reading is the differential reading between thermocouple junction 3 on multiplexer 93 and the reference point 0 on multiplexer 94. If we define V3 and V0 as the voltage signal (without bias or random noise) from thermocouple junction 3 and reference point 0 respectively, then this reading will be equal to:

$$V3+e1-(V0+e2) \quad (4)$$

The next reading will be taken between thermocouple junction 4 (V4) and the reference point 0 (V0) and it is equal to:

$$V0+e1-(V4+e2) \quad (5)$$

By subtracting (in the microprocessor) the voltage reading of equation (3), the voltage reading of equation (5) we get the accurate differential reading of thermocouple 4 relative to thermocouple junction 2 (i.e. the errors e1 and e2 are eliminated). This differential reading of thermocouple 4 relative to 2 could have been measured directly instead of being calculated. Similarly, the voltage reading of the odd junctions relative to the first odd junction (junction 3) will also eliminate the non-random errors. It is to be noted that by placing accurate absolute temperature sensor close to the reference point 0, (i.e. coupling thermally junction 0 and the absolute temperature sensor) it will be possible to determine accurately the absolute temperature of each thermocouple junctions. Using thermocouple junctions of Constantine and Copper each one degree C. correspond to 40 microvolt voltage difference between the reference point 0 and a thermocouple junction on the probe. The data acquisition has a reference absolute temperature sensor 97 and the microprocessor 22 can send out the absolute temperature from each junction either as Analog or digital signal 100. In addition to using the microprocessor to calibrate the non-random error of the electronic hardware and the wiring, the microprocessor will also be used to average the differential time samples reading of each thermocouple and at this way to minimize the magnitude of the random error. In addition, the algorithm will further reduce the remaining errors from each thermocouple measurement by using a correlation technique which spread the remaining positive and negative error from each thermocouple junction over a set of thermocouples that include thermocouples that are in liquid and thermocouples that are above the liquid. The software of the microprocessor uses the readings with minimal errors from all of thermocouples to complete the calculation of the liquid level, or determine the kind of liquid or other liquid parameters like viscosity, from the profile of the temperatures(or voltage) along the probe, the microprocessor then will send those parameters to a digital or analog display through a serial and digital-to-analog converter input/output 100. It is to be noted that the elimination of the non-random electronic hardware errors, minimization by averaging of random errors and the use of correlation function in the voltage reading from the thermocouples as well as the pulsed heating of the probe will be done with software in the microprocessor.

If instead of using two multi-plexers one uses a single multi-plexer then the bias and drift (non-random) errors can be minimizes or eliminated by taking two readings from the single multiplexer. First a reading when the multiplexer is shortened. Then a reading from the multi-plexer when a cold and a hot thermocouple junctions are connected to the multi-plexer. Taking the difference between those two readings will give the voltage (temperature) of the hot junction without the non-random errors of the hardware.

The data acquisition will include a circuitry and the microprocessor will include an algorithm which will monitor the health of the sensor. For example, when a thermocouple junction is electrically disconnected or shorted, the voltage reading from such disconnected thermocouple junction will be a large number and the microprocessor with its software determines which junction is disconnected. Similarly, the health monitoring circuitry can send a reference signal (voltage) and monitor which component in the electronic circuitry of the data acquisition is not working properly and need to be replaced.

The liquid level sensor invention described (the strip is most useful design to control the character of the temperature profile) herein can also be adopted to detect ice formation on the external surfaces of an aircraft, roads, roofs and bridges by characterizing the signature (detail in the profile) associated with the "Igloo effect" and the various forms of water/ice. Disturbing the heat flow. When the sensor is covered with ice, it is normally insulated thermally from the surrounding air or water. When the probe is heated, and the amount of power applied to the probe is not too high then at the beginning of the power application, the probe temperature will not rise since the ice needs power to overcome its latent heat and change the phase of a thin layer of ice to water. The volume of the melted ice is smaller than the volume of the ice and there will be an air gap between the melted water and the remaining ice. The additional heat that is applied to the probe will raise the air gap temperature to the level expected when a surrounding wall of ice, not in contact with the probe, insulates thermally the melted thin layer of ice from the environment. The transient and steady-state data will be used to infer what is there (i.e. ice, water, air etc) on any section of the probe.

Figure 11:
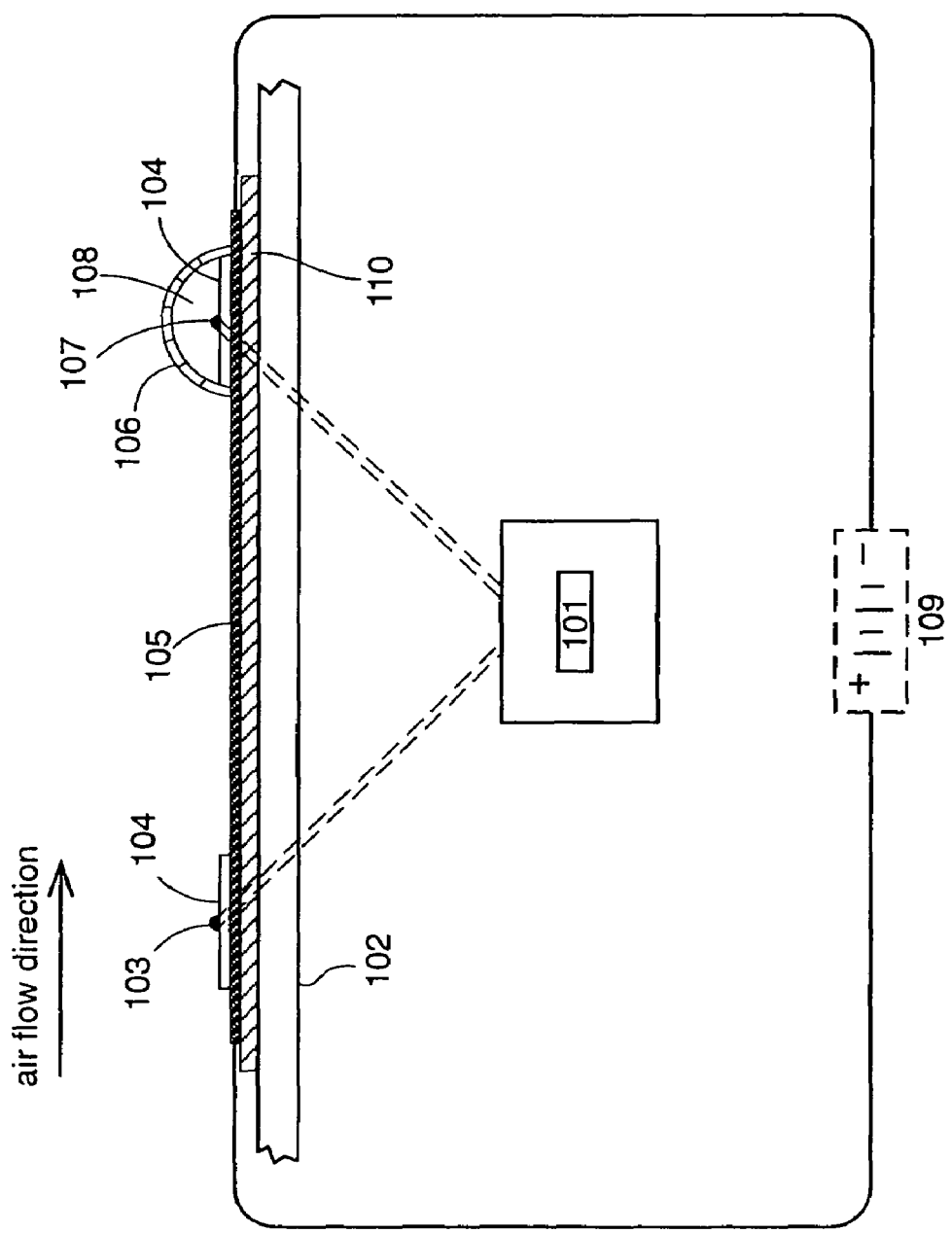
FIG. 11 Schematic Diagram of Ice Detection Sensor.
Figure 12:
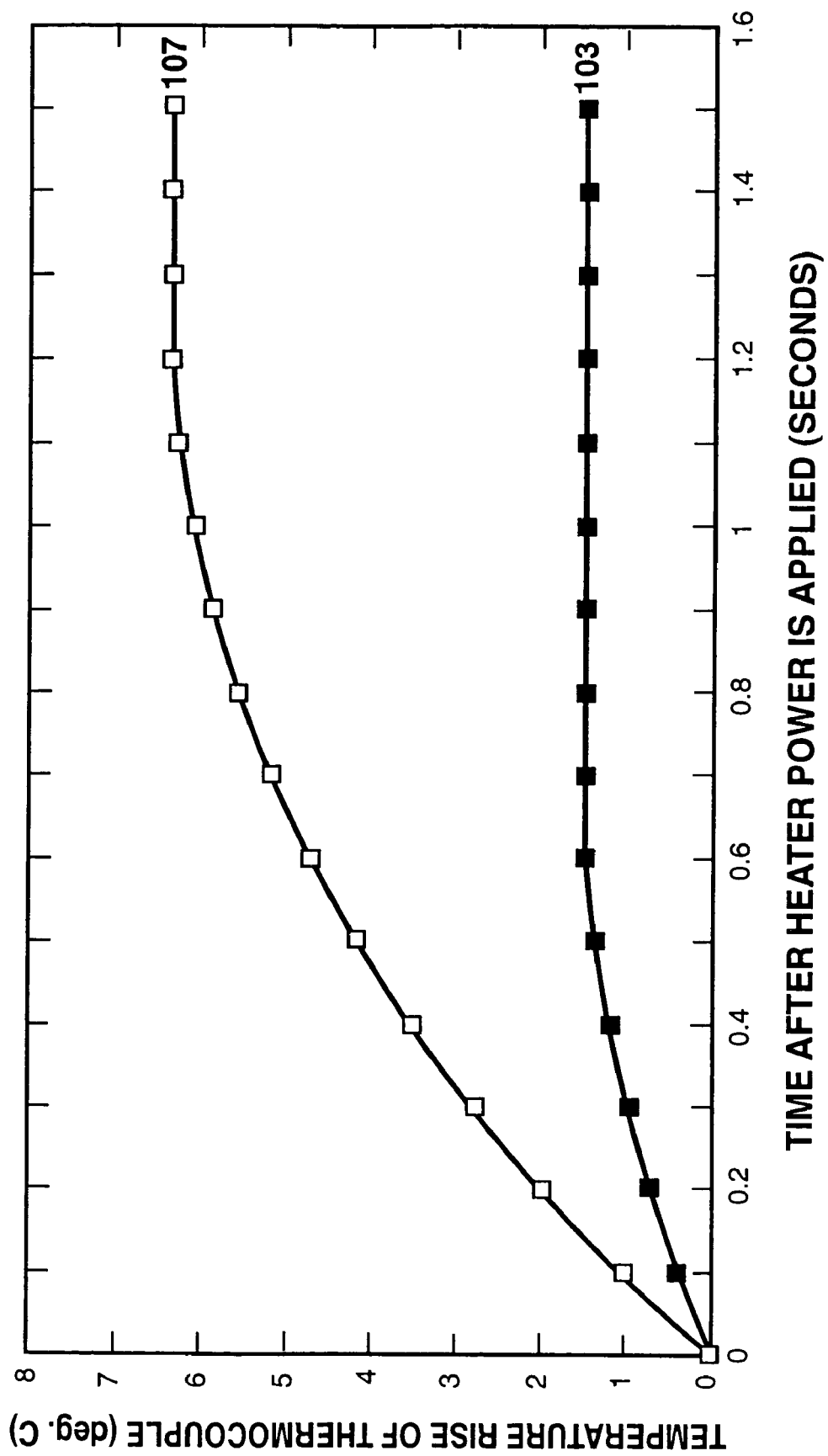
FIG. 12 Temperature rise of Thermocouples 103 and 107 after power is applied for no ice condition.
Figure 13:
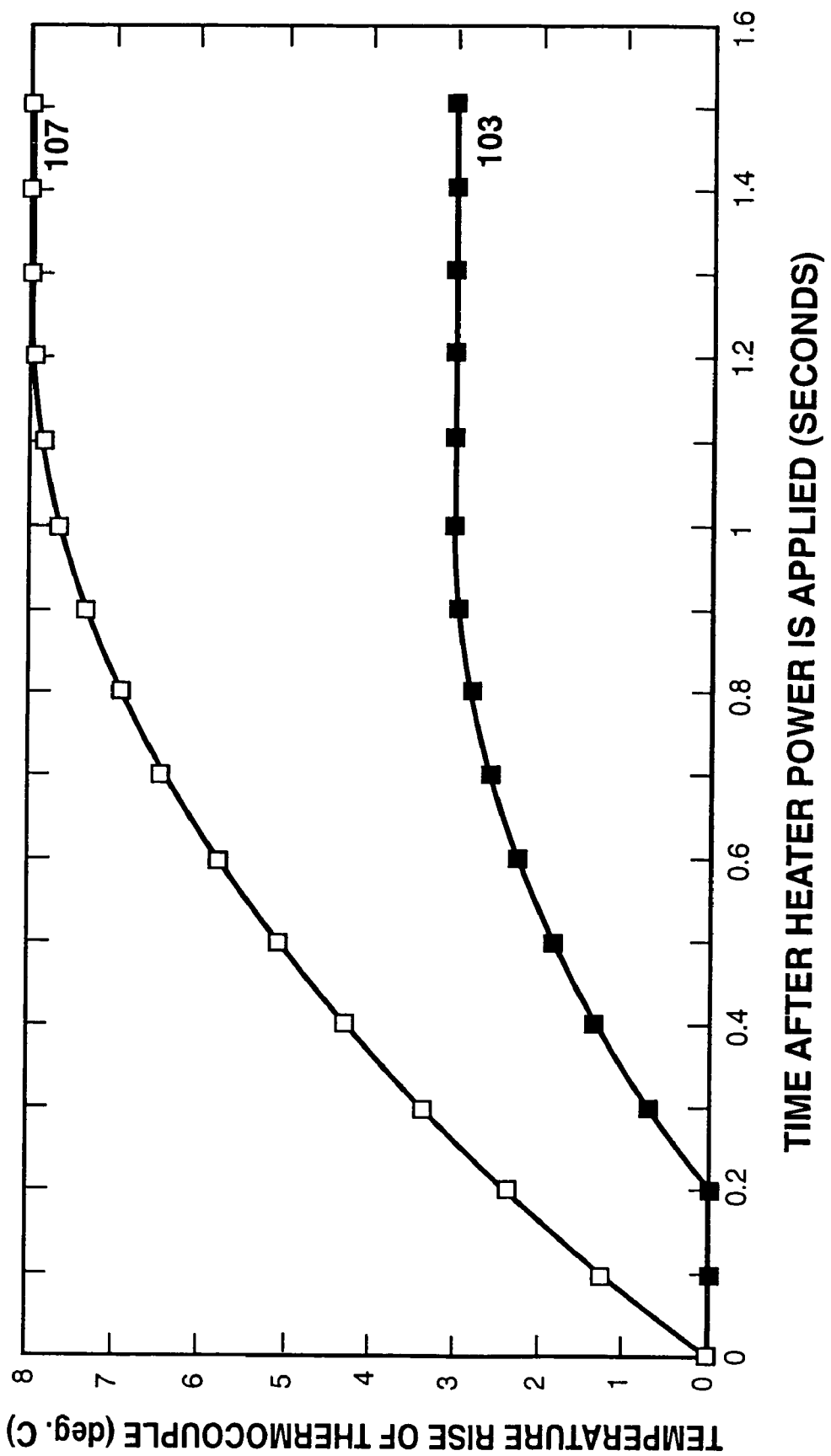
FIG. 13 Temperature rise of thermocouples 103 and 107 with ice formed over the sensor.

One version of the sensor for detecting ice is illustrated in FIGS. 11, 12 and 13. FIG. 11 is a schematic diagram of the ice detection sensor attached to the surface of an aircraft wing 102 or other structure. The sensor is comprised of an insulating material or insulation 110 attached to the wing surface, a heater strip 105 attached to the thermal insulation 110, a power supply 109 for providing electrical power to the heater strip, two sections of film type insulator 104, attached to the heater strip to electrically isolate the thermocouples from the heater, a first thermocouple 103 attached to the first film insulator and exposed to the outside air, a second thermocouple 107 attached to the second film insulation, an insulated dome 106 enclosing 107 within which a volume of air 108 is also enclosed, and a data acquisition system 101 or similar device to read and/or record the temperatures or equivalent voltages measured by thermocouples 103 and 107. The heater strip has active heating areas only immediately under thermocouples 103 and 107.

In FIG. 11 when there is no ice forming over the wing surface, the ice detection device is exposed to air that flows over the surface of the wing. When no power is applied to the heater strip, the temperature of thermocouples 103 and 107 are essentially equal to the temperature of the air flowing over the wing surface. When a certain amount of power is applied to the heater strip, the temperature of thermocouples 103 and 107 will rise and level off to their steady-state values. This steady-state temperature rise is expressed by the following equation:

$$DT = QR \quad (6)$$

Where DT is the steady-state temperature rise,

Q is the power dissipated in the vicinity of the thermocouple,

R is the overall thermal resistance between the sensor and the surface in the vicinity of the thermocouple and the air flowing over the surface.

The transient temperature is the rise as a function of time of thermocouple 103 and 107 and is expressed by the following equation:

$$DT(t) = DT(!-\exp(-Bt)) \quad (7)$$

Where DT(t) is the temperature rise as a function of time, exp is a natural logarithmic function, B is the inverse of the system time constant (response) which is in turn a function of the overall system thermal resistance and the overall system thermal capacitance, t is the time variable.

As can be seen in equation 6 and 7, DT is a constant while DT(t) is an exponential function. The characteristic plots of DT(t) for thermocouples 103 and 107 as a function of time are shown in FIG. 12, for a case where there is no ice formation on the surface of the wing (see FIG. 11). After the heater power has been applied for sometime (at least 4 time constant of the thermocouple response or other combination of power application scheme that will reduce the time to reach steady-state), DT(t) for each thermocouple reaches its maximum (i.e. steady-state) value. The maximum value is equal to DT, the steady-state temperature rise expressed in equation 6.

When there is ice formation on the wing surface of the aircraft, the temperature rise profile of thermocouple 103 and 107 are altered somewhat. When ice covers the dome of thermocouple 107 and thermocouple 103 and power is applied to the heater strip, a thin layer of ice from the thicker ice that covers thermocouple 103 will be melted and since the volume of water is smaller than the volume of ice, there will be an air gap between the melted water and the ice above it. This is sometimes referred to as the "Igloo Effect". The temperature rise profiles as a function of time DT(t) are shown in FIG. 13. Thermocouple 107 has essentially the same temperature rise shape as that when there is no ice formation on the dome 106 except that DT(the steady-state temperature rise) is somewhat higher, because of the additional thermal resistance induced by the layer of ice over the insulated dome. The DT)t) shape (profile) of thermocouple 103 has been more drastically altered however. In this profile, after power application, there is no temperature rise for a short duration (for the example of FIG. 13, it is the first 0.2 seconds) because the temperature of 103 does not change while the change of phase from solid (ice) to liquid (water), i.e. the melting of the ice, is taking place. After the melting of the thin layer of ice has essentially ceased, because the heated area above 103 is too remote from the remaining ice, the temperature of 103 begins to rise. As 103 temperature rises it assumes a similar shape as that where there is no ice formation but reaches a higher steady-state value because of the ice surrounding thermocouple 103. Based on FIG. 13 and 12, it can be seen that the profile of thermocouple 103 with ice cover has three parameters that are different than the temperature profile without ice. The three parameters are time delay at the beginning of applying power (i.e. no rise in the temperature of thermocouple 103), higher steady-state value and a response time that is closer to the response time of thermocouple 107 of FIG. 12 or 13. The calculation of the three parameters will be done with the software of a microprocessor. The same invention can be used for a probe with a single dome type of a thermocouple and a lot of thermocouples like thermocouple 103 to detect ice at different locations over the wing of an aircraft. The sensor of FIG. 11 can be mounted on a horizontal or vertical surfaces of aircraft. A modified version of the ice-detector shown in FIG. 11, is one that has a constant strip that act as the heater (when the heat pulses have a duration that is much smaller than the thermal response time of the Constantan strip) as well as the common wire for the thermocouples. The data acquisition of FIG. 10 together with a probe of FIG. 9 and a dome of FIG. 11 were used in various icing tunnel tests. In those tests, the readings from thermocouple 107 and 103 are differential relative to the reference point 0. The temperature rise in equations 6 and 7 are the differential voltages of thermocouples 103 and 107 relative to the reference pint 0.

Figure 8:
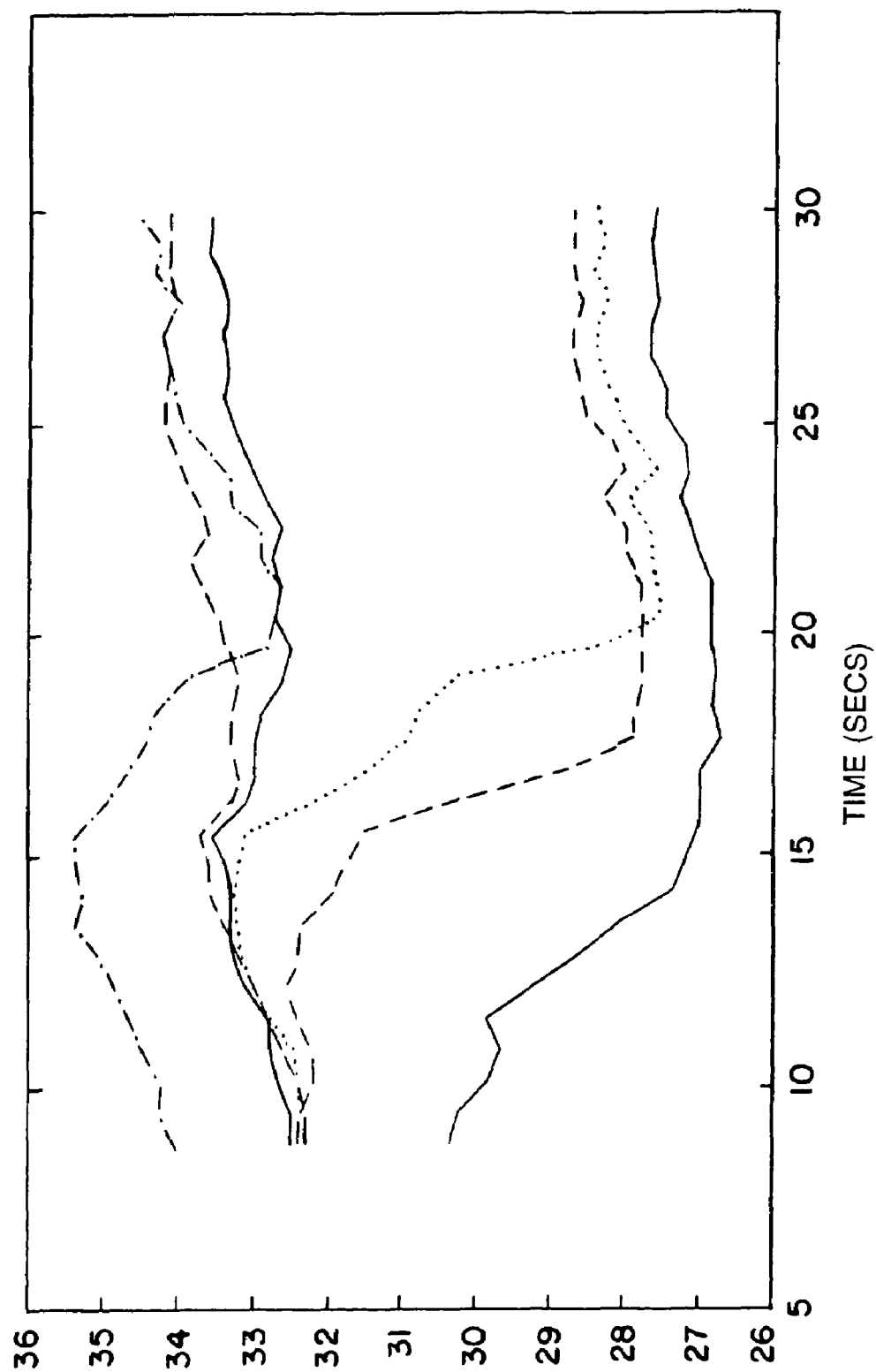

Further tests of the behavior of the probe when immersed in a body of fluids containing water and oil, wherein the lighter oil stratifies above the water. There is a difference in temperature between that when the probe is in water and when it is in oil, as seen in FIG. 8, where the probe is moved up and down during the various time periods of the experiment.

The principle of operation described in this invention can also be applied to the measurement of the viscosity of a liquid, because viscosity is a key parameter that determines the convective heat transfer efficiency of the liquid. The lower the viscosity of the liquid the more efficiently it can transfer the heat, and the smaller the temperature difference between the heated surface and the liquid (DT) will be. An increase in viscosity of the liquid, which would result in a higher DT, generally indicates that the lubricating quality of the liquid has deteriorated to some degree. As such, a probe that work on the principle of this invention, can be used to determine whether it is time to replace a liquid, such as lubricating oil in an automotive engine.

The invention described herein can also be used to determine the density of incompressible liquid. By measuring the temperature of the liquid and its pressure (with an appropriate pressure-measuring device such as pressure transducer) at the same location, it is possible to compute, with a suitable microprocessor, the density of the liquid.

The invention described herein can also be used to determine accurately the liquid or gas temperature at the thermal junctions of the probe. Since the probe responds to the temperature differential between any two thermal junctions along the common strip (Constantan strip in FIG. 9), a reference accurate temperature sensor may be located at a convenient point (or the strip extended to such a point) and the temperature at any other point along the probe is resolvable. The calculation of the absolute temperature of each thermocouple location will be done with software using the thermocouple voltage differential whose non-random errors have been eliminated and random errors have been minimized using filtering which includes averaging and correlation functions.

The measurement process for this sensor relies on acquiring data from several temperature sensors and reconstructing an analog thermal profile along the heater of a liquid sensor as sampled by those temperature sensors at strategically located points along a heater. The signal from the temperature sensors can be digitized in a number of ways, from simply dwelling on each tap in turn until the signal is adequately resolved to briefly reading each tap and increasing the signal resolution as needed through accumulating the results of multiple reads of a temperature sensors set. Likewise, the commutation sequence need not follow any specific order; however, noise reduction and ease of data processing are likely to dictate the optimal sampling approach for any given applications. Equally, a simultaneous sampling of all taps, using either multiple parallel converters or multiple sample/hold amplifiers, is workable (although this is likely to be the least cost-effective approach).

TABLE 1

TEMPERATURES AT 6 THERMOCOUPLE LOCATIONS

| THERMOCOUPLE NO | LIQUID LEVEL DEVICE TEMPERATURES ° C.) | | |
|---|---|---|---|
| | ALL IN AIR | ALL IN WATER | TC 4, 5 & 6 IN WATER |
| 1 | 34.493 | 20.145 | 33.207 |
| 2 | 34.493 | 20.145 | 31.914 |
| 3 | 34.493 | 20.145 | 28.035 |
| 4 | 34.493 | 20.145 | 20.52 |
| 5 | 34.493 | 20.145 | 20.149 |
| 6 | 34.493 | 20.145 | 20.145 |

NOTE: BOTH AIR AND WATER TEMPATURES = 20° C.

TABLE 2

PROBE TEMPERATURE VS POSITION OF LIQUID LEVEL BETWEEN TC3 AND TC4

| POSITION DISTANCE FROM TC3* (MM) | TC3 TEMP ° C. | TC4 TEMP ° C. | TC3-TC4 ° C. |
|---|---|---|---|
| 0.00 | 20.6583 | 20.1445 | 0.5138 |
| 1.27 | 21.6055 | 21.1451 | 1.4604 |
| 2.54 | 22.5432 | 20.1454 | 2.3978 |
| 3.81 | 23.4567 | 20.1460 | 3.3107 |
| 5.08 | 24.3350 | 20.1477 | 4.1873 |
| 7.62 | 25.9577 | 20.1644 | 5.7933 |
| 8.89 | 26.6949 | 20.1971 | 6.4978 |
| 10.16 | 27.3829 | 20.2842 | 7.0987 |
| 11.43 | 28.0347 | 20.5194 | 7.5153 |
| 12.70 | 28.7412 | 21.0100 | 7.7312 |

*SEE FIG. 3
NOTE: AIR AND WATER TEMP = 20° C.

The invention claimed is:

1. A method for measuring fluid properties in a three dimensional liquid container, said method comprising providing a liquid level sensor with common heater and plurality of temperature sensors, producing three components on a monotonic profile wherein the profile comprises:
   a line along most of the lineal dimension of the sensor that is immersed in liquid;
   a line along a significant portion of the lineal dimension of the sensor that is in air or other medium above the liquid;
   a steep or shallow curved line connecting said two lines;
   wherein the geometry of the heater is designed to control the shape of the profile.

2. The method as set forth in claim 1 wherein the liquid level sensor further comprises of plurality of temperature sensors which said temperature sensors are located at strategic vertically spaced points and located very close to the common heater.

3. The method as set forth in claim 1, wherein the liquid level sensor further comprises a signal conditioning circuitry that filters and amplifies a signal from said temperature sensors.

4. A method as set forth in claim 1, wherein the liquid level sensor further, comprising a signal processing software, capable of eliminating non-random electronic hardware errors and minimizing random errors in differential voltage reading of said temperature sensors.

5. A method as set forth in claim 1, wherein the liquid level sensor further comprises a signal processing software capable of determining absolute temperature of each said temperature sensors using said differential voltages.

6. A method as set forth in claim 1, wherein the liquid level sensor is coated with a thermally conductive, electrically insulating, chemically inert, slippery and liquid impermeable, encapsulating coating of said sensor.

7. The method recited in claim 1 wherein said monotonic profile is a voltage or temperature profile each of its three components is constructed from reading of one or more temperature sensors after power is applied to the heater and after zeroing one of the voltage and the temperature reading from all of the temperature sensors.

8. The method recited in claim 1, wherein the said monotonic profile is used to detect the presence of two or more different stratified liquids, such as oil and water, and determining the level of each liquid.

9. The method recited in claim 1 wherein the said monotonic profile is used to detect the level at pre-set points at one of the bottom and top of liquid containers such as oil pan, fuel tanks and coolant reservoir.

10. The method recited in claim 1 wherein the said monotonic profile is used to determine the kind of liquid based on curvature of the temperature profile and the rise of temperature of the temperature sensors in liquid and temperature sensors in air.

11. The method recited in claim 1, wherein said monotonic profile is used to determine the density of incompressible liquid based on a continuous liquid level and temperature reading together with a reading from a single pressure sensor.

12. The method recited in claim 1, wherein a section of said monotonic profile will be used to determine pressure leakage of compressible fluid.

13. The method recited in claim 1 wherein the said monotonic profile is used to determine viscosity degradation of liquids based on curvature of the temperature profile and the rise of temperature of the heater section in liquid and the temperature of the heater section in air.

* * * * *